Patented Oct. 2, 1934

1,975,443

UNITED STATES PATENT OFFICE 1,975,443

PRODUCTION OF SODIUM HYPOSULPHITE AND ZINC COMPOUNDS

Max Bazlen and Emil Rieger, Ludwigshafen-on-the-Rhine, and Fritz Scholtz, Mannheim, Germany, assignors to I. G. Farbenindustrie Aktiengesellschaft, Frankfort-on-the-Main, Germany No Drawing. Application December 16, 1930, Serial No. 502,850. In Germany January 18, 1930

4 Claims. (Cl. 23—147)

The present invention relates to the production of pure zinc oxide and sodium hyposulphite.

Sodium hyposulphite ($Na_2S_2O_4$) is frequently prepared by leading sulphur dioxide into an aqueous suspension of zinc dust, the solution of zinc hyposulphite ($Na_2S_2O_4$) thus obtained being treated with an aqueous solution of caustic soda or of sodium carbonate. After this treatment a dark grey to black paste of zinc oxide remains, for which it is difficult to find employment by reason of the impurities contained therein.

We have now found that a very pure zinc oxide together with sodium hyposulphite can be obtained by adding, at any stage, to the aqueous reaction mixtures of equivalent quantities of zinc dust and of sulphur dioxide at least 1 per cent (by weight of the zinc dust employed) of zinc oxide, zinc dust or zinc carbonate, the resulting solution of zinc hyposulphite being freed by filtration from zinc dust, zinc oxide or carbonate suspended in the solution and from impurities and then treated with caustic soda or sodium carbonate, in which latter case the zinc carbonate formed is heated to form zinc oxide. This process can be carried out by employing from the start a higher quantity of zinc dust than is required for complete conversion of the sulphur dioxide employed, or zinc dust, oxide or carbonate may be added to the reaction mixture in the aforesaid quantities after the main reaction or, alternatively, the solution obtained from equivalent quantities of zinc dust and of sulphur dioxide may be incorporated with a small quantity of sodium hydroxide or carbonate, whereby zinc oxide or, respectively, zinc carbonate is precipitated. By either of these methods the solutions are prevented from becoming acid by the decomposition of the hyposulphite during filtration and a highly valuable zinc oxide or carbonate can be obtained from these solutions.

The following examples will further illustrate the nature of this invention but the invention is not restricted to these examples.

Example 1

Sulphur dioxide is led while cooling and stirring into a suspension in 410 litres of water of 71 kilograms of zinc dust containing 92.5 per cent of metallic zinc until the zinc dust has disappeared and a pale yellow solution of zinc hyposulphite has been formed in which lead and metal sulphides are still suspended. For this purpose from about 132 to 134 kilograms of sulphur dioxide are necessary. Another from 2 to 3 kilograms of zinc dust or from 4 to 6 kilograms of zinc oxide are then added while stirring and the whole is filtered immediately through a filter press. After immediately washing the residue with water, the filtered solution of zinc hyposulphite is treated with an approximately 23 per cent solution of caustic soda; from about 98 to 103 kilograms of sodium hydroxide are necessary for this purpose. The zinc oxide which separates out during the conversion is filtered off, washed and dried.

The zinc oxide obtained is of a pale yellowish-white colour and contains from 97 to 98 per cent of ZnO.

Instead of leading in from 132 to 134 kilograms of sulphur dioxide and then adding from 2 to 3 kilograms of zinc dust to the solution of zinc hyposulphite formed, a correspondingly smaller amount of sulphur dioxide, as for example 128 kilograms, may be led in so that from 2 to 3 kilograms of zinc dust remain, the resulting whole then being filtered and treated as hereinbefore described.

Example 2

Sulphur dioxide is led while stirring and cooling into a suspension in 410 litres of water of 71 kilograms of zinc dust containing 92.5 per cent of metallic zinc until the zinc dust has disappeared and a pale yellow solution of zinc hyposulphite has been formed in which lead and metal sulphides are still suspended. This requires from about 132 to 134 kilograms of sulphur dioxide. From 4 to 6 kilograms of zinc carbonate, or from 2 to 3 kilograms of zinc dust, are then added while stirring and the whole is filtered immediately through a filter press, the precipitate being washed with water. The filtered solution of zinc hyposulphite is treated with 152 kilograms of calcined soda in about 1000 litres of water until a filtered sample no longer contains zinc. The mass is then filtered and washed with water. Instead of the zinc carbonate from 3 to 4 kilograms of soda may be employed. Instead of introducing from 132 to 134 kilograms of sulphur dioxide and adding zinc dust or zinc carbonate, a lower quantity of sulphur dioxide as for example 128 kilograms may be used, so that a remainder of from 2 to 3 kilograms of zinc dust is left, the filtration and precipitation being then carried out as described above.

The compound zinc carbonate/sodium carbonate which has been filtered off is then stirred with boiling water, washed with hot water and dried.

The zinc carbonate obtained is of a white colour and free from extraneous metals and furnishes a pure zinc oxide on heating.

What we claim is:

1. In the production of sodium hyposulphite and zinc oxide the steps which comprise causing sulphur dioxide to react on an equivalent quantity of zinc dust in aqueous suspension, providing for an amount of a substance selected from the group consisting of zinc dust, zinc oxide and zinc carbonate corresponding to at least 1 per cent by weight of the zinc dust reacted with the sulphur dioxide to be present in the reaction mixture after the reaction has subsided, filtering the reaction mixture and adding to the filtrate a compound selected from the group consisting of sodium hydroxide and sodium carbonate to convert the zinc hyposulphite into sodium hyposulphite.

2. In the production of sodium hyposulphite and zinc oxide the steps which comprise causing sulphur dioxide to react on an equivalent quantity of zinc dust in aqueous suspension, adding an amount of a substance selected from the group consisting of zinc dust, zinc oxide and zinc carbonate corresponding to at least 1 per cent by weight of the zinc dust reacted with the sulphur dioxide to the reaction mixture after the reaction has subsided, filtering the reaction mixture and adding to the filtrate a compound selected from the group consisting of sodium hydroxide and sodium carbonate to convert the zinc hyposulphite into sodium hyposulphite.

3. In the production of sodium hyposulphite and zinc oxide the steps which comprise causing sulphur dioxide to react on an aqueous suspension of a quantity of zinc dust which is larger than the amount equivalent to the sulphur dioxide employed by at least 1 per cent by weight, filtering the reaction mixture after the reaction has subsided and adding to the filtrate a compound selected from the group consisting of sodium hydroxide and sodium carbonate to convert the zinc hyposulphite into sodium hyposulphite.

4. In the production of sodium hyposulphite and zinc oxide the steps which comprise causing sulphur dioxide to react on an equivalent quantity of zinc dust in aqueous suspension, adding a quantity of a compound selected from the group consisting of sodium hydroxide and sodium carbonate corresponding to at least 1 per cent by weight of the zinc dust employed after the reaction has subsided, filtering the reaction mixture and adding to the filtrate a compound selected from the group consisting of sodium hydroxide and sodium carbonate to convert the zinc hyposulphite into sodium hyposulphite.

MAX BAZLEN.
EMIL RIEGER.
FRITZ SCHOLTZ.